United States Patent
Suter et al.

(10) Patent No.: US 8,955,428 B2
(45) Date of Patent: Feb. 17, 2015

(54) BLOCKED ORIFICE TUBE SENSOR FOR CITRUS JUICE EXTRACTOR

(75) Inventors: Michael L. Suter, Lakeland, FL (US); Jose D. Milla, Lakeland, FL (US); David S. Danner, Tampa, FL (US)

(73) Assignee: John Bean Technologies Corporation, Chicago, IL (US)

( * ) Notice: Subject to any disclaimer, the term of this patent is extended or adjusted under 35 U.S.C. 154(b) by 80 days.

(21) Appl. No.: 13/561,297

(22) Filed: Jul. 30, 2012

(65) Prior Publication Data

US 2014/0030393 A1    Jan. 30, 2014

(51) Int. Cl.
*A23N 1/00* (2006.01)

(52) U.S. Cl.
USPC ................. 99/495; 100/37; 100/213

(58) Field of Classification Search
CPC .................... A23L 2/06; A23N 1/003
USPC ........... 99/495, 509, 513, 510, 490, 547, 565; 100/37, 108, 213, 282, 107; 116/70, 116/112, 273
See application file for complete search history.

(56) References Cited

U.S. PATENT DOCUMENTS

| | | | | |
|---|---|---|---|---|
| 2,547,207 A * | 4/1951 | Harworth et al. | | 99/490 |
| 3,418,546 A * | 12/1968 | Beavers et al. | | 361/283.1 |
| 3,736,865 A * | 6/1973 | Hait | | 100/98 R |
| 3,737,166 A * | 6/1973 | Knight | | 273/372 |
| 3,817,168 A * | 6/1974 | Maytum | | 99/490 |
| 3,831,515 A * | 8/1974 | Breton et al. | | 100/37 |
| 4,009,650 A * | 3/1977 | Lascelles et al. | | 99/490 |
| 4,089,212 A * | 5/1978 | Peekna | | 73/787 |
| 4,181,835 A * | 1/1980 | Stadler et al. | | 200/82 E |
| 4,206,871 A * | 6/1980 | Nilsson | | 494/10 |
| 4,300,449 A * | 11/1981 | Segredo | | 100/98 R |
| 4,376,409 A * | 3/1983 | Belk | | 99/509 |
| 4,710,389 A * | 12/1987 | Dornow | | 426/231 |
| 4,922,813 A * | 5/1990 | Compri | | 99/510 |
| 4,951,563 A * | 8/1990 | Warren et al. | | 100/111 |
| 5,024,147 A * | 6/1991 | Petit et al. | | 99/549 |
| 5,970,861 A * | 10/1999 | Suter et al. | | 100/37 |
| 5,992,311 A * | 11/1999 | Suter et al. | | 100/37 |
| 5,996,485 A | 12/1999 | Suter et al. | | |
| 6,375,996 B1 | 4/2002 | Suter et al. | | |
| 6,426,107 B1 | 7/2002 | Thomas et al. | | |
| 6,427,584 B1 | 8/2002 | Thomas et al. | | |
| 6,497,912 B2 | 12/2002 | Milla et al. | | |
| 6,568,319 B2 * | 5/2003 | Schrader et al. | | 100/108 |
| 6,912,951 B2 * | 7/2005 | Brandao et al. | | 100/35 |
| 7,156,016 B2 | 1/2007 | Schrader et al. | | |
| 7,222,567 B2 | 5/2007 | Schrader et al. | | |
| 7,856,340 B2 * | 12/2010 | Kaneko et al. | | 702/179 |
| 8,245,726 B2 * | 8/2012 | Mathews et al. | | 137/553 |
| 2009/0081338 A1 | 3/2009 | Mathews et al. | | |
| 2010/0294143 A1* | 11/2010 | Schmitt et al. | | 99/547 |

* cited by examiner

*Primary Examiner* — Henry Yuen
*Assistant Examiner* — John J Norton
(74) *Attorney, Agent, or Firm* — Christensen O'Connor Johnson Kindness PLLC (57) ABSTRACT

A juice extractor includes a strainer tube mounted to receive juice and pulp of a fruit. An orifice tube reciprocates within the strainer tube and has an ejection port and is configured to generate pressure and separate juice and pulp, collect core, and discharge core out of the ejection port. A sensor is positioned adjacent the orifice tube and configured to sense material ejected from the ejection port.

15 Claims, 7 Drawing Sheets

BLOCKED ORIFICE TUBE SENSOR FOR CITRUS JUICE EXTRACTOR

FIELD OF THE INVENTION

The present invention relates to the processing of fruit and vegetables, and more particularly, this invention relates to a citrus juice extractor that includes a sensor configured to detect a blocked orifice tube and associated methods.

BACKGROUND OF THE INVENTION

Citrus juice extraction on a commercial scale is advantageously performed with a juice extractor. For example, an inline juice extractor manufactured by the assignee of the present invention includes opposing cups such as upper and lower cups that move relative to one another along a reciprocal path of travel. The sides of both the upper and lower cups typically include fingers that support a fruit so that it can be squeezed without bursting. The fingers of the upper cup interdigitate or intermesh with those of the lower cup. An orange, other citrus fruit or some types of vegetables can be fed, for example, to the bottom cup by a cam-operated feeding device. The upper and lower cups are then brought together so that the respective fingers of the cup intermesh and the fruit therebetween is accordingly squeezed.

Sharp, typically circular, cutters are positioned in the top and bottom cups. As the cups move relative to each other, the fruit is pressed against the cutters, which cut plugs from both the top and bottom portions of the fruit as the interdigitating fingers of the two cups mesh together. The cutting of the plug from the top portion of the fruit promotes separation of the peel from the internal portions of the fruit (i.e., juice and pulp). The plug cut from the lower portion of the fruit allows the internal portions of the fruit to be forced down into a strainer tube positioned just below the lower cup cutter. The strainer tube, in turn, is positioned within a manifold.

After the internal portions of the fruit have been squeezed into the strainer tube, an orifice tube moves upward into the strainer tube applying pressure to the internal portions of the fruit. This causes the juice and juice sacs, due to their small particle size, to flow through small holes of the strainer tube and into the juice manifold, thus separating out the juice and pulp.

Further details relating to the citrus juice extractor may be found in commonly assigned U.S. Pat. No. 5,970,861 to Suter et al.; U.S. Pat. No. 5,992,311 to Suter et al.; U.S. Pat. No. 7,156,016 to Schrader et al.; and U.S. Patent Publication No. 2009/0081338 to Mathews et al., and the entire contents of each reference which are incorporated herein by reference.

One of the design and engineering goals with this type of juice extractor has been to develop components used within the extraction process that will maximize yield and quality and increase productivity in extractor feed efficiency. One method for attaining these goals has been to provide automated systems that measure and control a juice extractor's performance when feeding fruit and extracting juice to ensure high product quality and overall yield. It is therefore desirable to sense or detect when poor fruit feeding or blockage occurs within the various juice extractor components that would negatively affect both juice yield and quality.

SUMMARY OF THE INVENTION

A juice extractor includes a strainer tube mounted to receive juice and pulp of a fruit. An orifice tube reciprocates within the strainer tube and has an ejection port and is configured to generate pressure and separate juice and pulp, collect core, and discharge core out of the ejection port. A sensor is positioned adjacent the orifice tube and configured to sense material ejected from the ejection port.

In an example, the sensor is configured to monitor the output of material ejected from the ejection port and determine when the orifice tube is blocked. In another example, opposing cups, such as upper and lower cups, are configured to support the exterior of a fruit. The drive mechanism is connected to the orifice tube and operative to reciprocate the orifice tube within the strainer tube. An extractor frame mounts the sensor in a position to be adjacent to the ejection port when the orifice tube is reciprocated into a position where core would be discharged.

In another example, the sensor includes a sensor body. A target plate is supported by the sensor body and configured to move a distance indicative of the density and force of material that is ejected from the ejection port and strikes the sensor. A proximity sensor is supported by the sensor body and configured to sense movement of the target plate. In another example, a processor is connected to the proximity sensor and receives and processes data regarding movement of the target plate and determines the extent of blockage in the orifice tube.

In another example, a magnet is connected to the sensor body and target plate and configured to bias the target plate from the sensor body. A first magnet is positioned adjacent the sensor body and a second magnet is positioned adjacent the target plate and repels each other to bias the target plate from the sensor body. A shaft extends through the sensor body and has a first end connected to the proximity sensor and a second end connected to the target plate through which movement of the target plate is transmitted to the proximity sensor. A target plate seal engages the sensor body and the target plate and provides a seal therebetween.

A method is also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
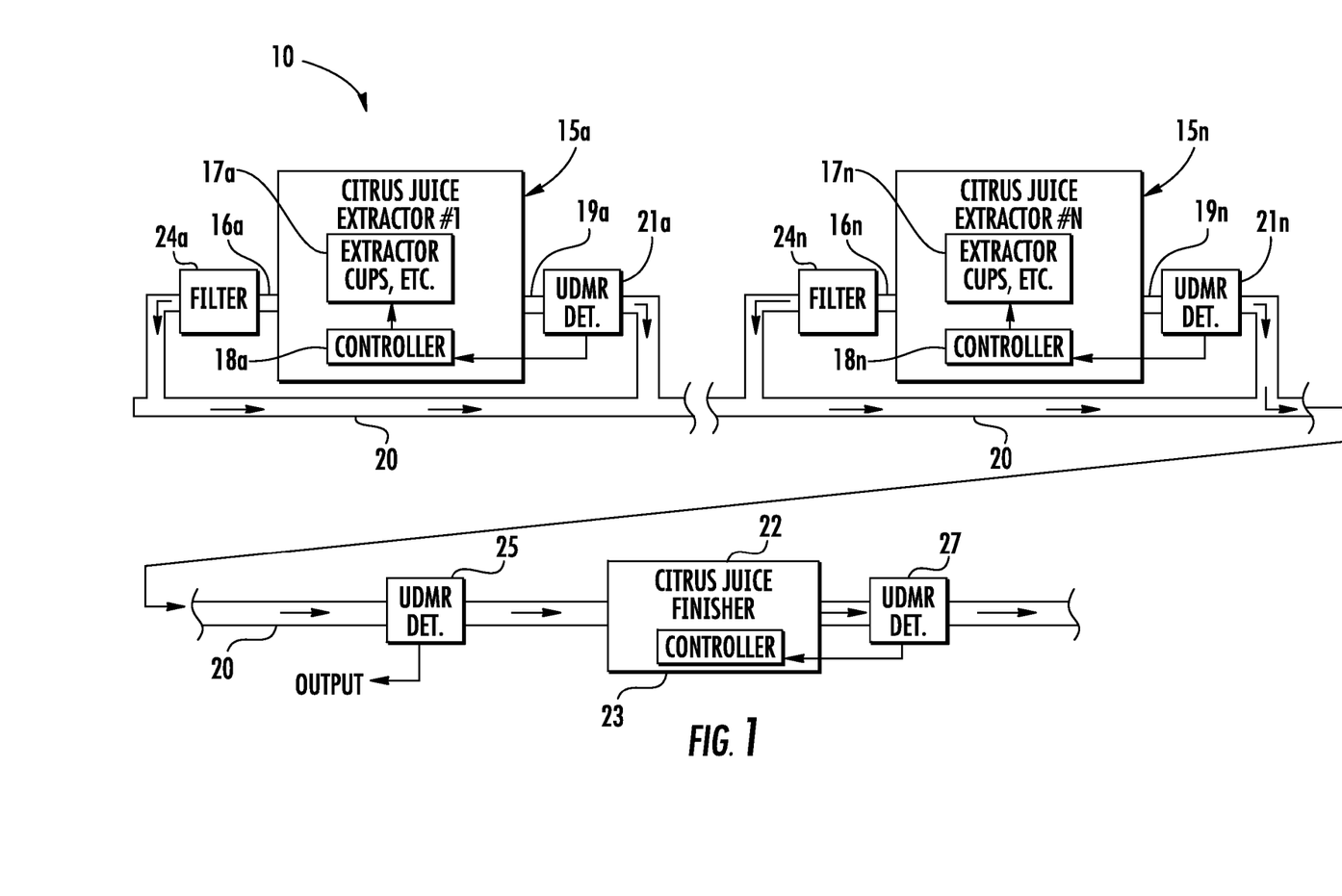
FIG. 1 is a schematic diagram of a citrus juice apparatus forming a juice extraction system with "N" Juice extractors in accordance with a non-limiting example.
Figure 2:
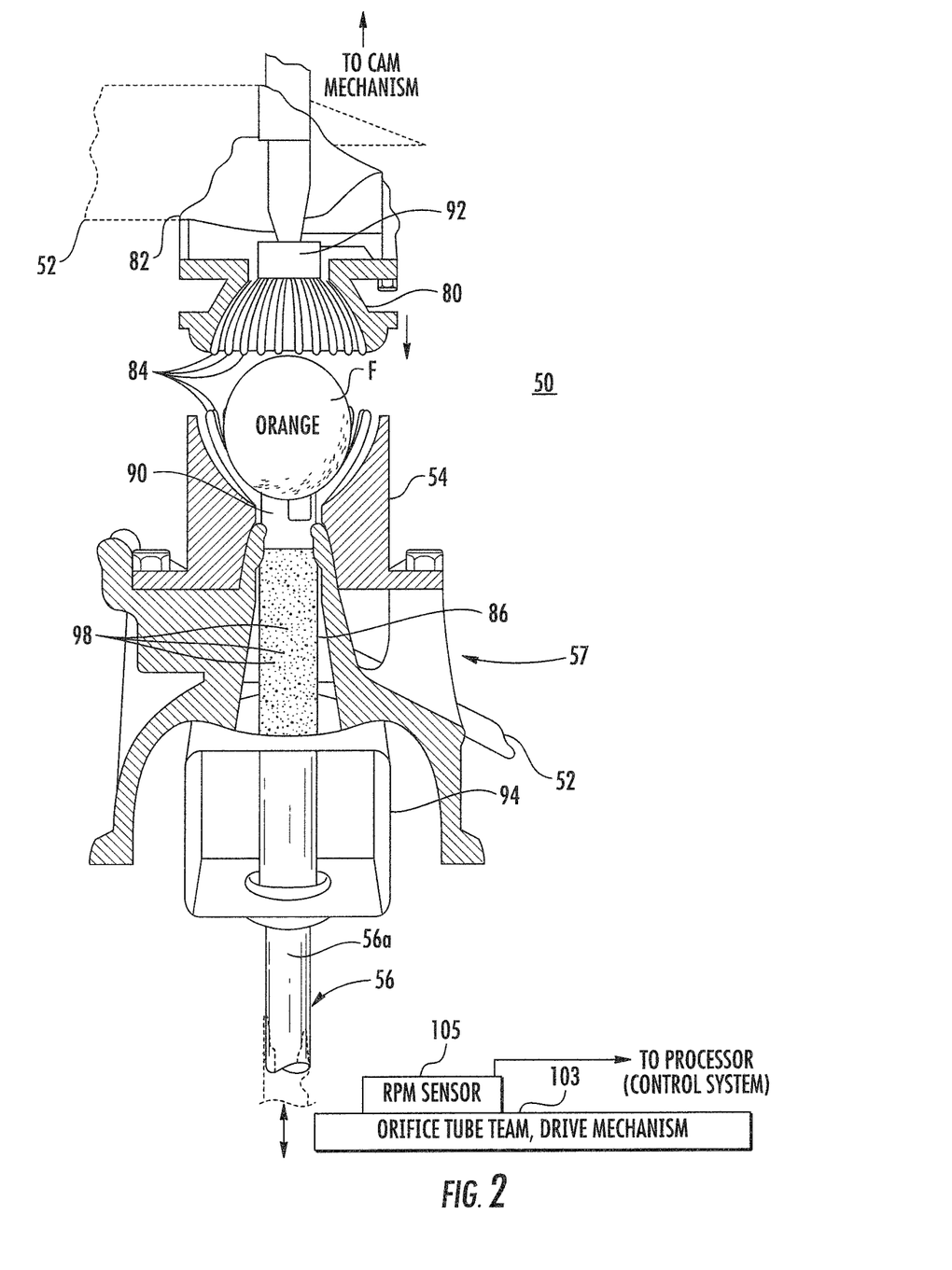
FIG. 2 is a partial, cross-sectional view of a portion of a juice extractor such as in the example shown in FIG. 1 in accordance with a non-limiting example.

Referring initially to FIGS. 1 and 2, a citrus juice apparatus 10 is now described. The apparatus 10 illustratively comprises a plurality of N citrus juice extractors 15a-15n, each illustratively including a first juice output 16a, 16n and a second juice output 19a, 19n each having a flow of juice therethrough, and which feed into a common header 20. In other embodiments, each juice extractor 15a-15n may include only one juice output, for example, or more than two outputs, for example. Each extractor 15a-15n illustratively includes a plurality of pairs of extractor cups, and associated drive components 17a-17n operatively connected to a controller 18a-18n as will be appreciated by those skilled in the art. Further details of a representative juice extractor 15a are disclosed in the above-identified U.S. Pat. No. 7,156,016 to Schrader et al.; U.S. Pat. No. 5,970,861 to Suter et al.; U.S. Pat. No. 5,992,311 to Suter et al.; U.S. Patent Publication No. 2009/0081338 to Mathews et al.

A juice finisher 22 is illustratively positioned at the output of the juice header 20. Both the juice extractors 15a-15n and the juice finisher 22 are representative of citrus juice processing devices that upon malfunction cause an undesired material release into the citrus juice output. Those of skill in the art will appreciate other similar citrus juice processing devices that may benefit from the undesired material detection devices and methods described herein.

In the illustrated example and as described in the incorporated by reference '338 published patent application, any of the juice extractors 15a-15n, upon a malfunction, causes an undesired material release along with the flow of juice into a respective juice output. This malfunction typically occurs when the strainer tube 86 (FIG. 2) fails causing the undesired material release. A respective undesired material release (UDMR) detector 21a-21n is illustratively coupled to a first juice output 19a-19n for detecting the undesired material release. A respective detector 21a-21n is associated with each juice extractor 15a-15n and coupled to its first juice output 19a-19n. This permits identification of the failed extractor when a plurality of extractors are used, as will be appreciated by those skilled in the art. In addition, an undesired material release detector 21a-21n may also optionally send a signal to the respective controller 18a-18n of the juice extractor 15a-15n such as to stop the malfunctioning extractor.

In addition to or in place of the detectors 21a-21n for the extractors 15a-15n, an undesired material release detector 25 may be positioned downstream from all of the extractors inline with the common header 20 as shown in the bottom portion of FIG. 1. In this variation, the output from the undesired material release detector 25 may be coupled to the controllers 18a-18n of all of the extractors 15a-15n or to another control device for the group of extractors as will be appreciated by those skilled in the art.

Yet another undesired material release detector 27 is illustratively coupled downstream from the citrus juice finisher 22. The output of the detector 25 is illustratively coupled to the controller 23 of the juice finisher 22, and may shut down the finisher upon detecting an undesired release of the material. The undesired material release detector 27 for the juice finisher 22 may be used alone or in combination with any of the other detectors 21a-21n, 25 as described above.

Referring to FIG. 2, a portion of a basic juice extractor unit 50 defining a juice extracting position of a juice extractor is illustrated. A moveable extractor cup 80 is mounted on a common cross bar, i.e., a cup support member, also referred to as the cup beam 82 in the illustrated embodiment. The cup beam 82 interconnects other moveable extractor cups, in one example, a total of five extractor cups, but that number can vary depending on design. The cup beam 82 reciprocates by a cam drive (not shown) contained in an upper portion of a juice extractor in this non-limiting embodiment. The fixed extractor cups 54, e.g., lower extractor cups in the illustrated embodiment, are rigidly positioned relative to the extractor frame 52 and mounted on a cup bridge 57. The moveable and fixed extractor cups 80,54 are formed as interdigitated extractor cups that have fingers 84 that intermesh together when the moveable extractor cup 80 engages fixed extractor cup 54.

The moveable and fixed extractor cups 80,54 and their associated components, such as the prefinisher strainer tube 86, the orifice tube 56, and associated cup bridge 57, form one juice extractor unit as shown in FIG. 1. A number of juice extractor units 50 can be ganged together in one juice extractor to increase production. The typical juice extractor machine includes five juice extractor units positioned at respective juice extracting positions. A fruit feeder (not shown) can work as a cam-operated device and includes feeding fingers, which deposit a single fruit in the fixed extractor cup 54, such as by tossing the fruit into the extractor cup after receiving the fruit from the feeder table formed as a fruit guide assembly.

The cam-operated drive system in the upper part of the juice extractor forces the moveable extractor cup 80 into the fixed extractor cup 54 and as this occurs, the fruit F is pressed against the circular cutter 90 located at the top of the prefinishing strainer tube 86. This cutter 90 cuts a plug in the bottom of the fruit to allow the internal portions of the fruit access to the strainer tube 86. Another cutter 92 also cuts a plug in the top of the fruit to permit separation of the peel from the internal portions of the fruit, such as the pulp. As the fingers 84 of the extractor cups 54,80 interdigitate or mesh together, the inner portion of the fruit, such as the pulpy juice, is forced down into the strainer tube 86 contained within the juice manifold 94. The peel surfaces do not contact the juice and any contamination by the extractives in the peel is minimized. The peel falls away outside the juice manifold 94 and can be collected by the peel screw conveyor, for example, (not shown) typically located under the extractor platform that mounts the various components and discharged into a hopper or other waste disposal container and conveyed through an exterior wall to a truck or trailer for further processing.

The continuing stroke of the moveable extractor cup 80 and the presence of a restrictor, for example, in the form of blockages, force the juice-bearing portion of the fruit through the perforated wall of the strainer tube 86. This perforated wall is formed by small strainer tube holes 98, which allow discharge of juice into the juice manifold 94.

Back pressure is preferably applied into the orifice tube, for example, by a hydraulic device such as described in the incorporated by reference U.S. Pat. No. 5,992,311 or by limiting the size of the size of a restrictor. The orifice tube 56 reciprocates within the strainer tube 86 to compress any entrapped fruit particles and force any remaining juice through the perforated wall of the strainer tube. Core material, such as section membrane and seeds, are ejected typically from the lower portion of the orifice tube through an orifice tube ejection port 97 (FIG. 3) during reciprocating movement of that orifice tube. This cycle of juice extraction is then complete.

Figure 3:
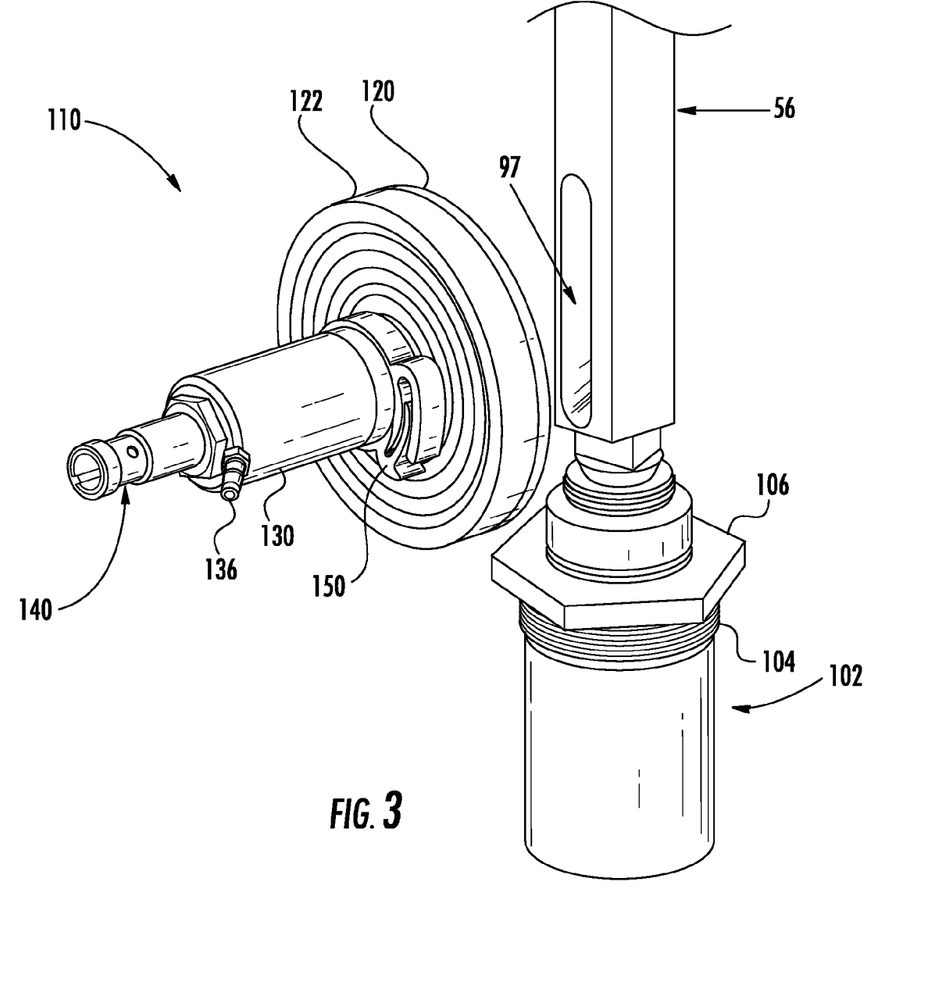
FIG. 3 is a fragmentary perspective view of an orifice tube, its ejection port and a blocked orifice tube sensor positioned adjacent the ejection port in accordance with a non-limiting example.

FIG. 3 illustrates the orifice tube 56 that includes at its lower end the orifice tube ejection port 97. The lower end of the orifice tube includes a cylindrically configured orifice tube support member 102 with a threaded portion 104. The support member 102 is received into an orifice tube beam and associated drive mechanism 103 (FIG. 2). The orifice tube beam supports the various orifice tubes, which are driven by the drive mechanism. This orifice tube beam would reciprocate, reciprocating the orifice tubes 56 within the strainer tubes 86. An adjustment nut 106 aids to secure the support member 102 to a mounting mechanism on the orifice tube beam and drive mechanism 103 (FIG. 2). It is possible to use more advanced designs such as disclosed in U.S. Pat. No. 5,992,311 that use hydraulic control of back pressure.

Additionally, the amount of juice yield and the type of juice can be varied by using different strainer tubes with different size holes 98. Additionally, the back pressure into the orifice tube can be changed to vary the juice yield and type of juice such as disclosed in U.S. Pat. No. 5,992,311. Peel oil, such as liberated by the shredding action of the moveable and fixed cups' fingers, typically can be washed by water sprays around the extraction cups.

During the whole fruit extraction process described above with the illustrated citrus juice extractor, a whole fruit is separated into four major components in a near simultaneous fashion. These components includes: (1) pulpy juice; (2) peel; (3) frit (small pieces of peel); and (4) core material (membranes, seeds, peel plugs).

As the orifice tube 56 moves upward compressing the material within the strainer tube 86, solid material such as the peel caps, seeds and membrane material is compressed and forced into a center bore hole of the orifice tube 56. Back pressure is applied to this material by the compression force applied to the longitudinal hole, i.e., bore, that runs almost the entire length of the orifice tube, thus preventing the material from instantly being ejected out of the tube and causing the juice to be lost through this exit. During normal operation, the orifice tube 56 can hold as many as five to six extracted cores at a given time depending on the size and variety of the fruit being processed. The juice extractor is designed such that these cores are ejected in sequential order. When ejected, the core material is pushed out of the orifice tube 56 with varying degrees of force. This core material may also be ejected as a single component or as scattered debris with each of the components ejected disassociated with the other components from the same piece of fruit. In some instances, a piece of foreign material enters the juice extraction process and plugs the center bore hole of the orifice tube, preventing proper flow of the core material from being ejected through the ejection port 97. The orifice tube is thus blocked, i.e., plugged, which causes a loss of yield and reduction in juice quality.

In those instances when the orifice tube 56 becomes blocked with material that prevents ejection of the core material that normally passes through the bore and out of the ejection port 97, pressure within the strainer tube 86 can increase to a level that damages the strainer tube. In addition, if that high pressure is transferred hydraulically up into the fruit as it is being compressed, the peel can improperly rupture in the cup causing an explosion of the remaining contents of the orange within the cup and impair the capability of the various juicing components from collecting the juice and solids.

In accordance with a non-limiting example, the juice extractor includes a blocked orifice tube detector system that determines when an orifice tube is blocked and incapable of passing material through the orifice tube. This system in one example can identify which tube in a processing facility is blocked. Use of this system reduces both yield loss and degradation of juice quality when the bore of the orifice tube is plugged. A second benefit derived by the detection of ejected material from the orifice tube 56 is the ability to determine if a cup is not receiving fruit or if the rate of fruit entering the cup is such that the extractor loses efficiency in overall production.

This blocked orifice tube detector system provides instantaneous monitoring of the material that is ejected from the orifice tube through an ejection port 97 while the juice extractor is running. In one non-limiting example, the detector system includes five sensors one for each of the orifice tubes that typically are mounted for vertical movement in a single juice extractor. An example sensor 110 is shown in FIG. 3 and positioned near the ejection port 97 of its respective orifice tube 56.

A RPM sensor 105 (FIG. 2) is typically incorporated with a juice extractor machine. This RPM sensor is illustrated as a block module in FIG. 2 and can be mounted in an appropriate position to sense orifice beam movement during extractor operation. It is typically an off-the-shelf sensor and formed as a proximity detector that measures the presence of the orifice beam. When the orifice beam moves in front of the sensor, the extractor has made a complete extraction cycle as 1 RPM. In a non-limiting example, the RPM sensor 105 is an 18 mm proximity device with extended range of up to 12 mm designed for food grade applications and operates similar to an IFM Effector model IGT 205. Each RPM sensor 105 has a threaded connector to aid in its insertion and removal on the RPM sensor mounting frame. This connector cooperates with a molded cable that is typically a M12 three or four pin connector, depending on the manufacturer of the sensor. This cable is routed along a RPM sensor mounting frame and diverted outside the extractor where it is terminated to an I/O device monitored by the extractor control system.

Each sensor 110 (FIGS. 3-7) used to sense material ejected from the orifice tube is mounted via a mounting assembly (not shown) and supported typically by the extractor frame. A control system, such as a processing unit that can also operate the juice extractor, can receive data from each sensor 110 for processing. Each sensor 110 is illustrated in FIGS. 3-7 and is designed to operate within the extremely harsh environment of a juice extractor. Each sensor can measure both large and small particles ejected out of the orifice tube 56 while being immune to the environment that applies both high vibration loading as well as high temperatures ranging from <50° F. to >160° F., including saturated humidity. This illustrated sensor 110 withstands harsh environments, but remains sensitive to measure when core material is ejected from the ejection port 97 by contacting the ejected material.

As illustrated, each sensor 110 is placed in front of the ejection port 97 on the orifice tube. Due to the variability of the size and mass of the material ejected from the ejection port 97 of the orifice tube 56, which is often determined by the fruit type and size range, the gap distance from the impacted target plate area forming the end of the sensor to the ejection port 97 ranges from 0.25 inches to as much as 1.0 inches. Typically, this gap is set based on the season because of climate impact on fruit and based on which predominate fruit is being processed. An example gap distance for optimum performance on oranges ranging in the small to average size is from about 0.5 to 0.75 inches. Limes having less than a two-inch diameter would have an optimum gap distance from about 0.25 to 0.5 inches. Typically once a sensor 110 has been set for a given location on a line of extractors, the gap does not need to be changed during the season once fruit has begun to be processed on that extractor.

Each sensor 110 is designed to be struck by the material ejected from the ejection port 97. Testing indicates that the contact pressure from this material on the sensor 110 can be as low as 15 grams and as high as 300 grams for a period less than 5-60 milliseconds in duration and the sensor remains operable. The sensor 110 can operate at a wide range of juice extractor speeds. The forces applied to the sensor 110, as well as its duration, vary dramatically based on fruit size and type of fruit and yet under many different circumstances, the sensor is operable. The sensor 110 can be used in many different fruit processing stages on a juice extractor and on many different types of fruit typically processed in citrus extraction worldwide throughout the citrus industry.

The sensor 110 can be coupled to a high speed data collection control system, such as part of the processing unit or controllers 18a-18n shown in FIG. 1. The data from a sensor 110, both on an individual juice extractor basis and on a line basis of multiple juice extractors such as shown in FIG. 1, can be used to extrapolate when a failure of either a blocked orifice tube or lane blockage has occurred and provide detailed information to the serviceman as to the location where the problem has been detected.

During normal operation, that material forced through the center of the orifice tube is ejected on a first-in, first-out basis from the ejection port 97 of the orifice tube. This ejected material strikes the sensor 110 that is located directly in front of the ejection port as best shown in FIG. 3. The sensor 110 is fixed and mounted on a stationary frame assembly for the juice extractor. The sensor 110 does not move as compared with the orifice tube 56, which as noted before, moves in a vertical up and down motion at a high rate of speed dependent on the RPM of the juice extractor machine. Typically, the cycle rate for this vertical orifice tube movement is between 100 and 120 times per minute. By nature of the design of the sensor and the corresponding controls monitoring the sensor, output speed does not impact the performance of the sensor.

Figure 4:
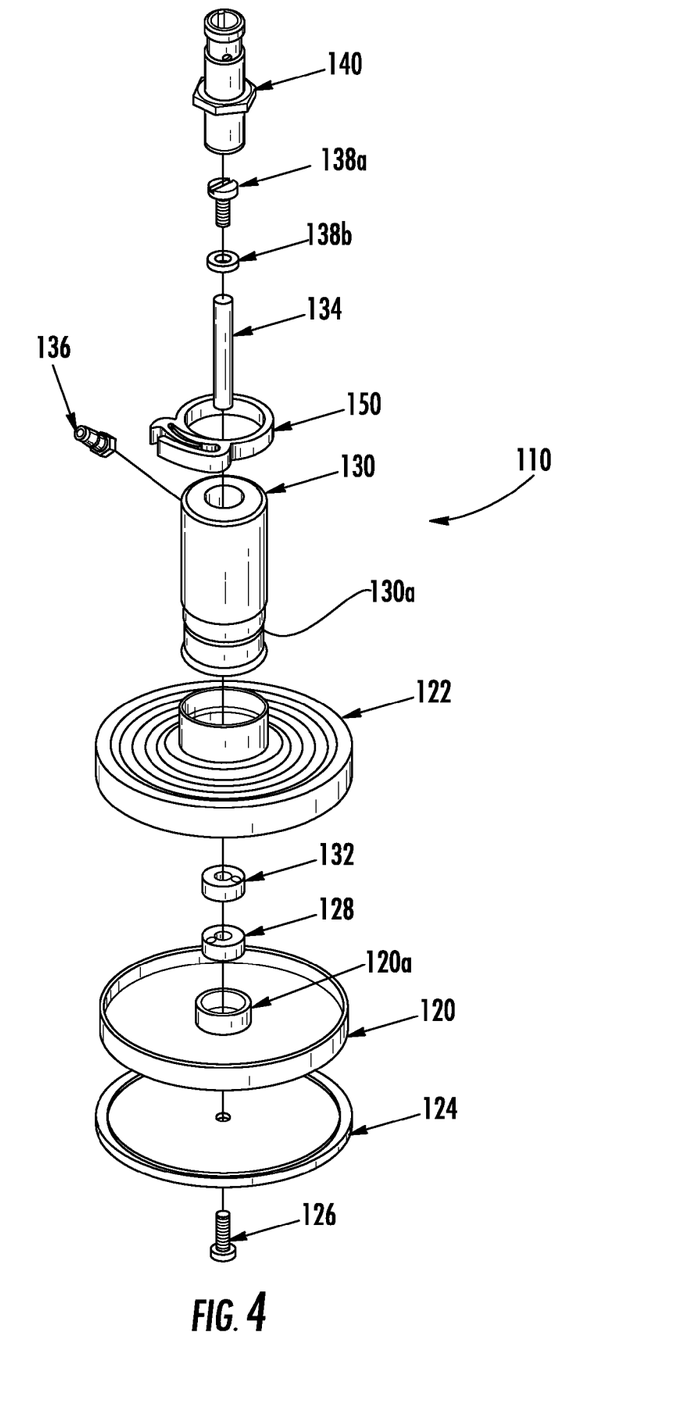
FIG. 4 is an exploded perspective view of the blocked orifice tube sensor shown in FIG. 3 in accordance with a non-limiting example.

Referring now to FIG. 4, a more detailed and exploded perspective view of the sensor 110 is illustrated. The sensor includes the following non-limiting components: target plate 120; target plate seal 122; target plate seal shield 124; target plate mounting screw 126; target plate repelling magnet 128; sensor body 130; sensor body repelling magnet 132; sensor body shaft 134; sensor body vent port 136; sensor body shaft end screw 138a and washer 138b; proximity sensor 140 and a snap clip or clamp 150 that fits around the body 130 and is received into the grooves 130a located at the end of the sensor body 130. This clamp 150 receives and secures a flexible "boot" or cover that is designed to extend over the body and make it more air and water tight and provide a better seal. This prevents liquid intrusion into the sensor. In some instances and depending on the operating environment to which the sensor is subjected, the vent port 136 may not be required, but typically the sensor 110 will include the vent port.

Figure 5:
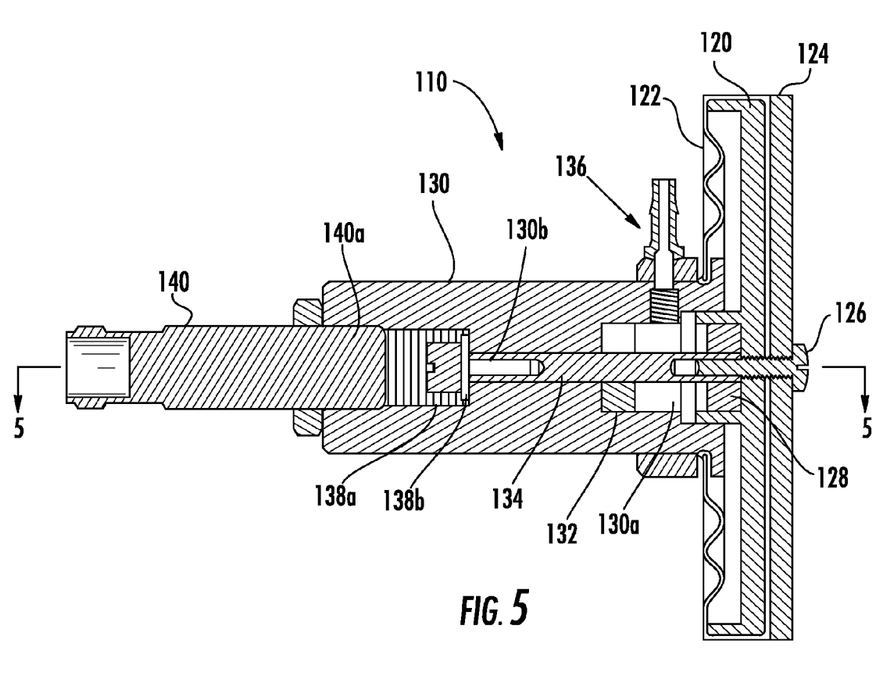
FIG. 5 is a partial sectional view of the blocked orifice tube sensor shown in FIGS. 3 and 4 and showing the vent port communicating with the internal cavity of the sensor body in accordance with a non-limiting example.
Figure 6:
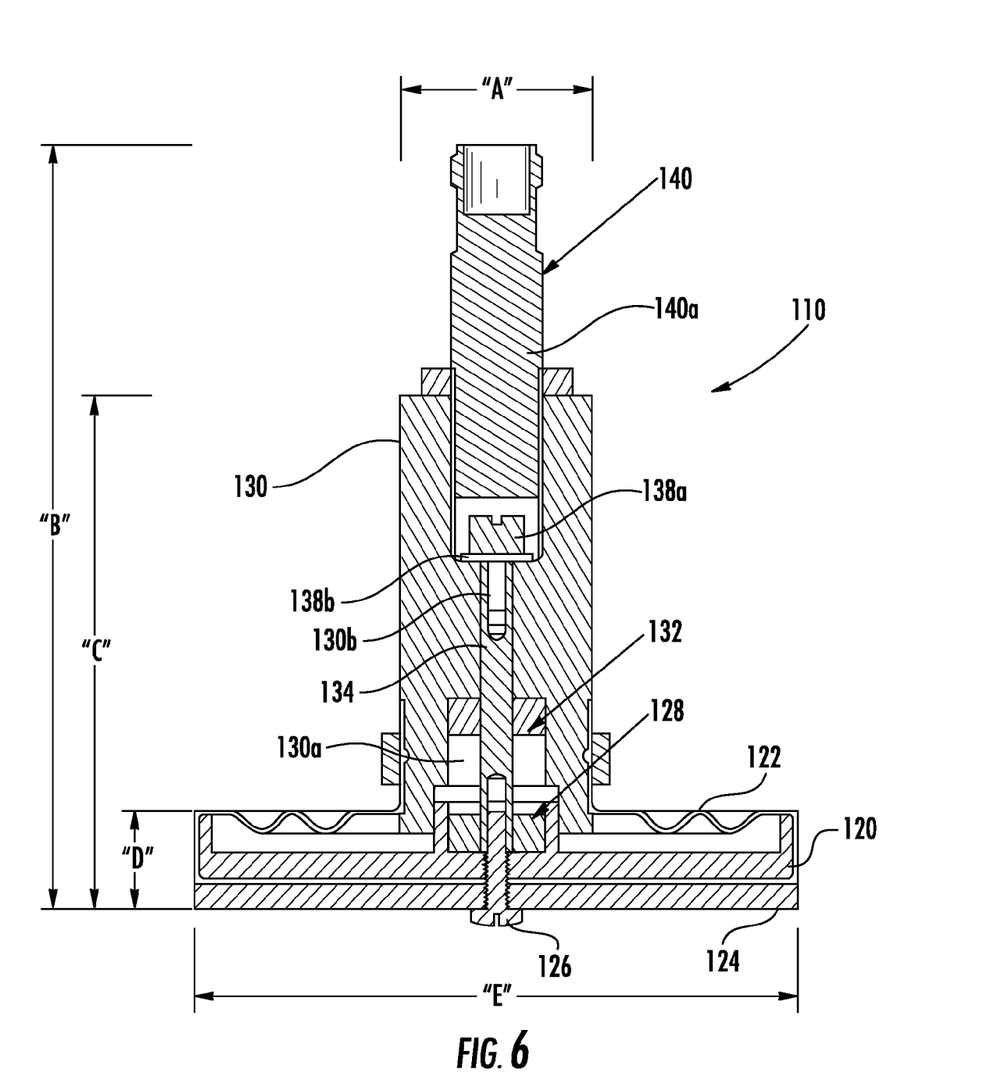
FIG. 6 is a cross-sectional view of the sensor in FIG. 5 taken generally along line 6-6 of FIG. 5.

FIG. 5 is a fragmentary plan and partial sectional view of the sensor and FIG. 6 is a detailed sectional view of the sensor 110 taken along lines 6-6 in FIG. 5. The vent port 136 in the embodiment of FIG. 5 communicates with the internal cavity 130a formed in one end of the sensor body that receives the two magnets 128, 132 and also receives an end of the sensor body shaft 134, which is received within a longitudinal bore 130b extending from one end of the sensor body and into the internal cavity 130a. The vent port 136 vents that cavity 130a such as by communicating with the internal cavity as in FIG. 5 or with the longitudinal bore 130b as shown in FIG. 6. The target plate 120 includes a hub member 120a that is received within the end of the sensor body at the internal cavity. The target plate mounting screw 126 is secured into the end of the sensor body shaft 134 and the other sensor body shaft end screw 138a is received in the other end of that shaft 134. The components are secured together.

FIG. 6 is a sectional view and also shows representative but non-limiting examples of dimensions that could be used to form the sensor 110. The sensor body 140 could have a diameter "A" of about 1 inch in a non-limiting example. The height "B" of the sensor 110 from the end of the proximity sensor to the target plate seal shield 124 is about 4 inches and in a non-limiting example about 3.9 inches but can range depending on specific applications and design. The length "C" from the end of the body member 130 to the target plate seal shield is about 2.5 inches and the distance "D" between the rear of the target plate seal and target plate seal shield is about 0.5 inches. The diameter "E" of the target plate is about 3 inches in a non-limiting example.

Figure 7:
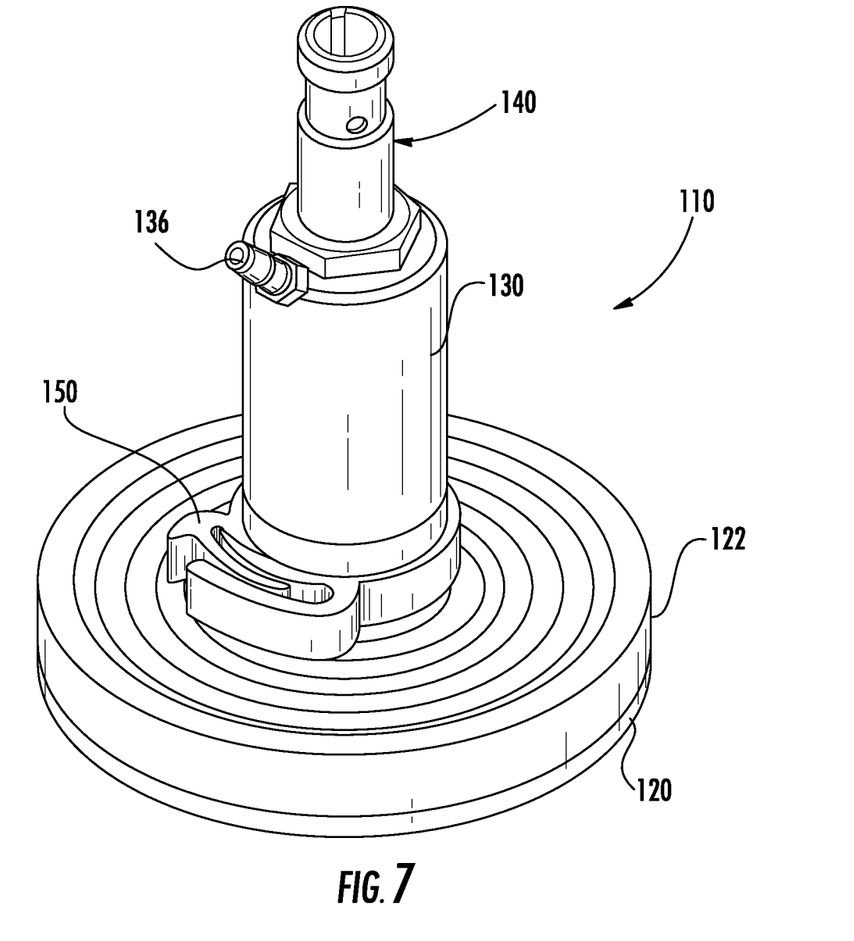
FIG. 7 is another perspective view of the assembled sensor.

FIG. 7 is a complete perspective view of the sensor 110 showing various components. The two opposing magnets as the target plate repelling magnet 128 and the sensor body repelling magnet 132 advantageously keep the target plate 120 away from the sensor body 130. In one example, the two magnets 128, 132 are neodymium magnets and formed as high density flux, ring magnets. The repelling force imparted by these magnets is not impacted by the high "g" forces of vibration found in the juice extractor. These vibrational forces are created by the vertical forces applied by the juice extractor and the "ringing" non-linear forces developed from the platform surface that mounts the juice extractor. These non-unidirectional vibrations prohibit the use of typical methods associated with sensors of this type.

The sensor body shaft 134 can be formed as a titanium alloy shaft and configured to extend through the magnet 128, 132 cores and allow for detection of low pressure spikes applied to the target plate seal shield 124 and transmitted through the target plate seal 122 to the target plate 120 when in contact with the core material. Stainless steel material typically has some amount of ferrous material in its composition. Because any ferrous material passing through the magnets 128, 132 will be attracted to the magnets and thereby affect the free movement of the shaft 134, field evaluation has shown that an optimum material used for the shaft 134 is titanium. Use of plastic for this shaft is unsuitable due to the flexibility of the material. Other non-ferrous materials such as copper is subject to severe oxidation due to the sensor environment.

This method of isolation for the shaft 134 allows for movement of the target plate seal shield 124, the target plate seal 122, and target plate 120, which is attached to the sensor body shaft 134, inducing it to move towards the rear of the sensor 110 in proportion to the movement of the target plate 120. The sensor body shaft 134 is not affected by the flux of the magnets 128, 132. Thus, only minor frictional loss occurs from movement of the shaft 134. At the opposite end of the shaft 134, an end screw 138a is received into the detection area 140a of the proximity sensor 140, which is typically a m12 food grade proximity sensor similar to an IFM effector MODEL IFM203. The time in which the sensor is located within the detection range of the proximity sensor varies depending on the density of the material striking the target plate 120 and the force with which it was ejected from the orifice tube 56 through the ejection port. While not critical, the time duration of detection must be sufficient to allow for any control system to monitor that a signal has been produced by the proximity sensor 140. Typically, this is not less than 5 milliseconds. Through empirical testing it has been determined that the repelling magnets 128, 132 are optimally formed as ring magnets as a N52 neodymium magnet and a N42 neodymium magnet that is 0.5 inches by 0.1875 thick and include a 0.219 inner diameter. A preferred pretreatment of coating the magnets with an epoxy sealant and/or plating is necessary to prevent degradation of the magnetic material.

The sensor 110 includes the flexible rubber seal 122, which prevents particles from entering the sensor body allowing free movement of the body with minimum restriction to movement. Due to the abrasiveness of the core material striking the target plate 120 and thus dislodging the seal from the target, the protective target plate seal shield 124 sandwiches the seal 122 to the target plate 120, preventing direct contact to the seal surface. This seal has been designed to be highly flexible allowing for minimum resistance to the movement of the target plate and its associated parts. This is primarily achieved by the selection of material, such as high strength silicon of about 30 durometer in a non-limiting example, and the use of a bellow style design as illustrated.

FIGS. 3-5 and 7 show the vent port 136, which is mounted near the contact point of the seal 122 to the sensor body 130 and communicates with the internal cavity 130a and the longitudinal bore 130b. Due to the extreme environmental variations and the sensitivity of the sensor 110 to applied forces, the internal areas of the sensor body are required to be vented to equalize pressure on both sides of the target plate 120 as the target is oscillating in its horizontal position when struck by material and then forced back by the repelling force of the magnets 128, 132. To prevent contamination of the sensor 110 from suctioning in unwanted solids or liquids within the surrounding area of the sensor, the vent port 136 is either connected at its end to a manifold open to the atmosphere in a clean area or connected to a high capacity filter used with each sensor. The end of the vent port includes a filter to connect to a hose such as a vacuum hose or other connector. Details of the construction of the vent port are explained above relative to the description of FIG. 5. If used with venting, the filter is typically a sintered metal filter used which allows gas flow exchange while holding back water or juice from getting into the sensor body.

Testing has been conducted to determine how well the sensor operates. The sensor 110 has detected the ejected material from fruit that is less than 1.5 inches and greater than 4 inches. In addition, different types of citrus fruit have been processed, including lemons, limes, oranges and grapefruit under laboratory testing conditions at John Bean Technologies Corporation's research facility in Lakeland, Fla.

At the conclusion of initial testing, enhancements had been made to the sensor to provide sealing of the sensor body 130. The target plate seal 122 had been added. After development of the seal 122 to fit between the sensor body 130 and the target plate 120, testing was reviewed and after two months of testing, the target plate seal shield 124 was added. The target plate seal is fabricated using high strength silicone that is 30 durometer in one non-limiting example. Once the target plate seal 122 was modified to prevent contamination of the internal operation of the sensor body 130, it was found that the internal cavity needed to be vented. This led to the introduction of the vent port 136 and additionally a vent port manifold or vent port filter. If used, the filter is typically a sintered metal filter used which allows gas flow exchange while holding back water or juice from getting into the sensor body.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A juice extractor, comprising:
opposing cups configured to apply pressure to a fruit to produce juice and pulp;
a strainer tube mounted to receive the juice and pulp;
an orifice tube having an ejection port;
a drive mechanism connected to the orifice tube and operative to reciprocate the orifice tube within the strainer tube and generate pressure within said strainer tube and separate the juice and pulp, collect core material, and discharge the core material out of the ejection port;
a sensor configured to sense ejection of core material through the ejection port, said sensor positioned before the ejection port to be stricken by the core material ejected through the ejection port; and
an extractor frame mounting said sensor in a position to be before the election port when the orifice tube is reciprocated into a position where the core material would be discharged; wherein said sensor comprises
a sensor body; and
a target plate supported by the sensor body and configured to quantify the density and force of the core material that is elected through the election port and strikes the sensor positioned before the election port.

2. The juice extractor according to claim 1, wherein said sensor further comprises:
a proximity sensor supported by the sensor body and configured to sense movement of the target plate.

3. The juice extractor according to claim 2, and further comprising a processor connected to the proximity sensor to receive and process data regarding movement of the target plate and determine the extent of blockage in the orifice tube.

4. The juice extractor according to claim 2, and further comprising a magnet connected to the sensor body and target plate and configured to bias the target plate from the sensor body.

5. The juice extractor according to claim 4, and further comprising a first magnet positioned adjacent the sensor body and a second magnet positioned adjacent the target plate and repelling each other to bias the target plate from the sensor body.

6. The juice extractor according to claim 2, and further comprising a shaft extending through the sensor body and having a first end sensed by the proximity sensor and a second end connected to the target plate through which movement of the target plate is transmitted to the proximity sensor.

7. The juice extractor according to claim 2, and further comprising a target plate seal engaging the sensor body and the target plate and providing a seal therebetween.

8. The juice extractor according to claim 1, wherein said opposing cups comprise upper and lower cups configured to support the exterior of the fruit.

9. A juice extractor, comprising:
a strainer tube mounted to receive the juice and pulp;
an orifice tube mounted to reciprocate within the strainer tube and having an ejection port and configured to generate pressure and separate the juice and pulp, collect core material, and discharge the core material out of the ejection port;
a sensor positioned in front of the ejection port of the orifice tube and the sensor configured to be stricken by core material ejected through the ejection port; and
an extractor frame mounting said sensor in a position in front of the election port when the orifice tube is reciprocated into a position where the core material would be discharged; wherein said sensor comprises a sensor body; and a target plate supported by the sensor body and configured to quantify the density and force of core material that is elected through the election port and strikes the sensor positioned before the election port.

10. The juice extractor according to claim 9, wherein said sensor further comprises:

a proximity sensor supported by the sensor body and configured to sense movement of the target plate.

11. The juice extractor according to claim 10, and further comprising a processor connected to the proximity sensor to receive and process data regarding movement of the target plate and determine the extent of blockage in the orifice tube.

12. The juice extractor according to claim 10, and further comprising a magnet connected to the sensor body and target plate and configured to bias the target plate from the sensor body.

13. The juice extractor according to claim 12, and further comprising a first magnet positioned adjacent the sensor body and a second magnet positioned adjacent the target plate and repelling each other to bias the target plate from the sensor body.

14. The juice extractor according to claim 10, and further comprising a shaft extending through the sensor body and having a first end sensed by the proximity sensor and a second end connected to the target plate through which movement of the target plate is transmitted to the proximity sensor.

15. The juice extractor according to claim 10, and further comprising a target plate seal engaging the sensor body and the target plate and providing a seal therebetween.

\* \* \* \* \*